(12) United States Patent
Nakamura

(10) Patent No.: US 8,348,446 B2
(45) Date of Patent: Jan. 8, 2013

(54) AREA LIGHT SOURCE DEVICE AND DISPLAY DEVICE

(75) Inventor: Tomoharu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 12/564,267

(22) Filed: Sep. 22, 2009

(65) Prior Publication Data

US 2010/0079978 A1 Apr. 1, 2010

(30) Foreign Application Priority Data

Sep. 26, 2008 (JP) ................................ P2008-247776

(51) Int. Cl.
*G09F 13/08* (2006.01)
(52) U.S. Cl. ...................... 362/97.3; 362/97.2; 349/64
(58) Field of Classification Search .................... 362/23, 362/24, 29, 30, 85, 88, 97.1, 97.3, 224, 231, 362/237, 240, 241, 245, 246, 330, 327, 555, 362/561, 607, 612, 613, 614, 615, 628, 629, 362/800, 806, 812; 349/61, 62, 64, 65, 68; 40/564, 565, 570, 572, 573
See application file for complete search history.

(56) References Cited

U.S. PATENT DOCUMENTS

| | | | | |
|---|---|---|---|---|
| 7,281,816 B2* | 10/2007 | Suzuki | ............... | 362/231 |
| 7,403,332 B2* | 7/2008 | Whitehead et al. | ............ | 359/443 |
| 7,654,687 B2* | 2/2010 | Tsai et al. | ..................... | 362/237 |
| 7,920,227 B2* | 4/2011 | Ajichi et al. | ..................... | 349/64 |
| 7,950,814 B2* | 5/2011 | Chang et al. | ................. | 362/97.3 |
| 7,959,343 B2* | 6/2011 | Ijzerman et al. | ............... | 362/625 |
| 2005/0219836 A1* | 10/2005 | Hung | ............................... | 362/97 |
| 2006/0002146 A1* | 1/2006 | Baba | ............................. | 362/613 |
| 2006/0146563 A1* | 7/2006 | Chen | ............................. | 362/561 |
| 2006/0208269 A1* | 9/2006 | Kim et al. | ....................... | 257/98 |
| 2007/0086179 A1* | 4/2007 | Chen et al. | ...................... | 362/27 |

FOREIGN PATENT DOCUMENTS

| | | |
|---|---|---|
| JP | 8-136917 | 5/1996 |
| JP | 11-109317 | 4/1999 |
| JP | 2003-077309 | 3/2003 |
| JP | 2005-17324 | 1/2005 |
| JP | 2005-203225 | 7/2005 |
| JP | 2005-338857 | 12/2005 |
| JP | 2006-227423 | 8/2006 |
| JP | 2006-286217 | 10/2006 |
| JP | 2006-324224 | 11/2006 |
| JP | 2007-141546 | 6/2007 |
| JP | 2008-123973 | 5/2008 |
| WO | WO-2008/050504 | 5/2008 |

* cited by examiner

*Primary Examiner* — Hargobind S Sawhney
(74) *Attorney, Agent, or Firm* — Finnegan, Henderson, Farabow, Garrett & Dunner, L.L.P.

(57) ABSTRACT

An area light source device according to the present invention includes a plate-shaped light guide plate that has one surface that serves as a transmissive surface and another surface that is on the opposite side from the transmissive surface and in which a plurality of recessed portions are provided. The area light source device also includes at least two light-emitting diodes that are accommodated in each of the recessed portions, that emit light in a direction in which the light guide plate extends, and that are disposed such that they emit light in different directions. In this configuration, directing a light-emitting face of any one of the light-emitting diodes such that it faces a given light-emitting area makes it possible to cause light to be emitted uniformly within the light-emitting area and also makes it possible to cause light to be emitted only within the specific light-emitting area.

16 Claims, 7 Drawing Sheets

AREA LIGHT SOURCE DEVICE AND DISPLAY DEVICE

BACKGROUND OF THE INVENTION

1. Field of the Invention

The present invention relates to an area light source and a display device.

2. Description of the Related Art

Technologies are known by which light-emitting diodes are provided in recessed portions that are provided in a light guide plate in a backlight device of a liquid crystal display device, such that light is emitted from the light guide plate, as described in Japanese Patent Application Publication No. JP-A-8-136917 and Japanese Patent Application Publication No. JP-A-2006-227423, for example.

Technologies are also known by which a display screen is divided into a plurality of blocks and the backlight brightness of each of the blocks is varied according to an input image signal, as described in Japanese Patent Application Publication No. JP-A-2005-17324 and Japanese Patent Application Publication No. JP-A-11-109317, for example.

SUMMARY OF THE INVENTION

However, with the technologies that are described in Japanese Patent Application Publication No. JP-A-8-136917 and Japanese Patent Application Publication No. JP-A-2006-227423, the light-emitting diodes that are provided in the recessed portions cause light to be emitted into the areas around the recessed portions, such that the brightness is diminished to the extent that the light is outside the recessed portions. This gives rise to irregularities in the contrast of the light guide plate per unit area and makes it difficult to emit light uniformly.

The technologies that are described in Japanese Patent Application Publication No. JP-A-8-136917 and Japanese Patent Application Publication No. JP-A-2006-227423 do not address the issue of varying of the backlight brightness of each of the blocks into which the screen is divided, as described in Japanese Patent Application Publication No. JP-A-2005-17324 and Japanese Patent Application Publication No. JP-A-11-109317. Therefore, the brightness of the areas around the recessed portions in which the light-emitting diodes are provided increases, and the image brightness is diminished to the extent that the light is outside the recessed portions. This makes it difficult to vary the amount of light that is emitted such that the brightnesses of the light-emitting areas and the non-light-emitting areas will be clearly differentiated in each block within the plane of the light guide plate.

Accordingly, the present invention addresses the problems that are described above and provides an area light source and a display device that are new and improved and that are capable of emitting light uniformly in each light-emitting area within the light guide plate.

According to an embodiment of the present invention, there is provided an area light source device that includes a plate-shaped light guide plate that has one surface that serves as a transmissive surface and another surface that is on the opposite side from the transmissive surface and in which a plurality of recessed portions are provided. The area light source device also includes at least two light-emitting elements that are accommodated in each of the recessed portions, that emit light in a direction in which the light guide plate extends, and that are disposed such that they emit light in different directions.

In this configuration, the light guide plate has one surface that serves as the transmissive surface and another surface that is on the opposite side from the transmissive surface and in which the plurality of the recessed portions are provided. The at least two light-emitting elements that are accommodated in each of the recessed portions emit light in the direction in which the light guide plate extends, and are disposed such that they emit light in different directions. Therefore, directing a light-emitting face of any one of the light-emitting elements such that it faces a given light-emitting area makes it possible to cause light to be emitted uniformly within the light-emitting area and also makes it possible to cause light to be emitted only within the specific light-emitting area.

The light guide plate may also be partitioned into a plurality of the light-emitting areas, and the light-emitting faces of the light-emitting elements may also be faced toward central regions of the light-emitting areas.

The light-emitting areas may also be hexagonal, and the light-emitting areas of the light guide plate may also be laid out by arranging the plurality of the light-emitting areas in a honeycomb structure.

The recessed portions may also be disposed at the midpoints of the sides of the hexagonal light-emitting areas, two of the light-emitting elements may also be accommodated in each of the recessed portions, and the light-emitting faces of the two light-emitting elements may also be disposed such that they respectively face toward the central regions of the two hexagonal light-emitting areas that abut one another at the side where the recessed portion is disposed.

The recessed portions may also be disposed at the vertices of the hexagonal light-emitting areas, three of the light-emitting elements may also be accommodated in each of the recessed portions, and the light-emitting faces of the three light-emitting elements may also be disposed such that they respectively face toward the central regions of the three hexagonal light-emitting areas that abut one another at the vertex where the recessed portion is disposed.

The light-emitting areas may also be quadrilateral, and the light-emitting areas of the light guide plate may also be laid out by arranging the plurality of the light-emitting areas such that they abut one another.

The recessed portions may also be disposed at the midpoints of the sides of the quadrilateral light-emitting areas, two of the light-emitting elements may also be accommodated in each of the recessed portions, and the light-emitting faces of the two light-emitting elements may also be disposed such that they respectively face toward the central regions of the two quadrilateral light-emitting areas that abut one another at the side where the recessed portion is disposed.

The recessed portions may also be disposed at the vertices of the quadrilateral light-emitting areas, four of the light-emitting elements may also be accommodated in each of the recessed portions, and the light-emitting faces of the four light-emitting elements may also be disposed such that they respectively face toward the central regions of the four quadrilateral light-emitting areas that abut one another at the vertex where the recessed portion is disposed.

The recessed portions may also be one of rectangles, squares, and rhombuses.

Reflective surfaces may also be provided on the bottom surfaces of the recessed portions.

Light discharge patterns that have shapes that are one of a prism and a lens may also be provided at positions in the transmissive surface that correspond to the recessed portions.

One of a scattering pattern and a reflective sheet may also be provided on the surface that is on the opposite side from the transmissive surface.

The light-emitting elements may also be configured from light-emitting diodes that are one of a side view type and a top view type.

The light-emitting elements may also be controlled such that the amount of light that is emitted in each of the light-emitting areas is different.

According to another embodiment of the present invention, there is provided a display device that includes a display panel and an area light source. The display panel displays an image. The area light source includes a plate-shaped light guide plate, one surface of which serves as a transmissive surface, that is provided with a plurality of recessed portions in a surface that is on the opposite side from the transmissive surface. The area light source also includes at least two light-emitting elements that are accommodated in each of the recessed portions, that emit light in a direction in which the light guide plate extends, and that are disposed such that they emit light in different directions. The area light source is disposed such that it faces the display panel.

In this configuration, in the display device that includes the display panel and the area light source, an image is displayed on the display panel. The light guide plate has one surface that serves as the transmissive surface and another surface that is on the opposite side from the transmissive surface and in which the plurality of the recessed portions are provided. The at least two light-emitting elements that are accommodated in each of the recessed portions emit light in the direction in which the light guide plate extends, and are disposed such that they emit light in different directions. Therefore, directing a light-emitting face of any one of the light-emitting elements such that it faces a given light-emitting area makes it possible to cause light to be emitted uniformly within the light-emitting area and also makes it possible to cause light to be emitted only within the specific light-emitting area.

The light guide plate may also be partitioned into a plurality of the light-emitting areas, and the light-emitting faces of the light-emitting elements may also be faced toward central regions of the light-emitting areas.

The light-emitting areas may also be hexagonal, and the light-emitting areas of the light guide plate may also be laid out by arranging the plurality of the light-emitting areas in a honeycomb structure.

The recessed portions may also be disposed at the midpoints of the sides of the hexagonal light-emitting areas, two of the light-emitting elements may also be accommodated in each of the recessed portions, and the light-emitting faces of the two light-emitting elements may also be disposed such that they respectively face toward the central regions of the two hexagonal light-emitting areas that abut one another at the side where the recessed portion is disposed.

The recessed portions may also be disposed at the vertices of the hexagonal light-emitting areas, three of the light-emitting elements may also be accommodated in each of the recessed portions, and the light-emitting faces of the three light-emitting elements may also be disposed such that they respectively face toward the central regions of the three hexagonal light-emitting areas that abut one another at the vertex where the recessed portion is disposed.

The light-emitting elements may also be controlled such that the amount of light that is emitted in each of the light-emitting areas is different.

According to the present invention, an area light source device and a display device can be provided that are capable of performing uniform light emission in each of the light-emitting areas in the light guide plate.

DETAILED DESCRIPTION OF THE PREFERRED EMBODIMENTS

Figure 1:
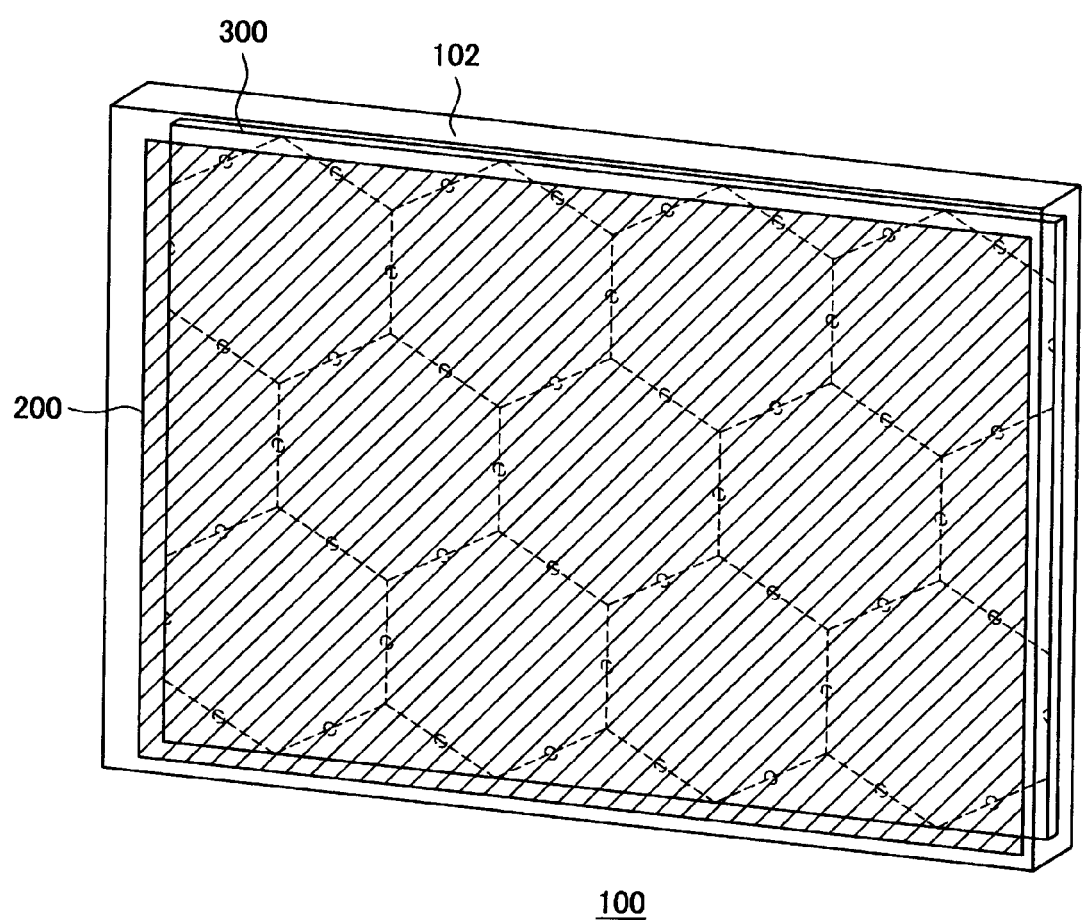
FIG. 1 is an oblique view that shows a configuration of a display device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that the explanation will cover the points below in order.

1. Configuration of a Display Device According to an Embodiment of the Present Invention 2. Configuration of a Light Guide Plate 3. Positional Relationships Between a Hexagonal Light-emitting Area and Light-emitting Diodes in Recessed Portions 4. Other Examples of Arrangements of Light-emitting Areas and Light-emitting Diodes 1. Configuration of a display device according to an embodiment of the Present Invention FIG. 1 is an oblique view that shows a configuration of an image display device 100 according to an embodiment of the present invention. All necessary portions of the image display device 100 are disposed in the interior of a housing 102.

An opening is formed in the front face of the housing 102 that passes through to the back of the housing 102, and a (liquid crystal cell) display panel 200 that displays an image is disposed in such a position that it blocks off the opening from the inside. The display panel 200 is configured by sandwiching a transparent color liquid crystal panel, for example, between two polarizing panels in front and back, and it displays a full color image by being driven by the active matrix method. The display panel 200 is not limited to being a liquid crystal panel, and the present embodiment can be applied to any display panel 200 that is illuminated from its rear surface by a light-emitting area light source, but in the explanation below, a liquid crystal panel is used as an example of the display panel 200.

An area light source device (backlight) 300 is disposed in the interior of the housing 102. The display panel 200 and the area light source device 300 are supported by the housing 102.

Figure 2:
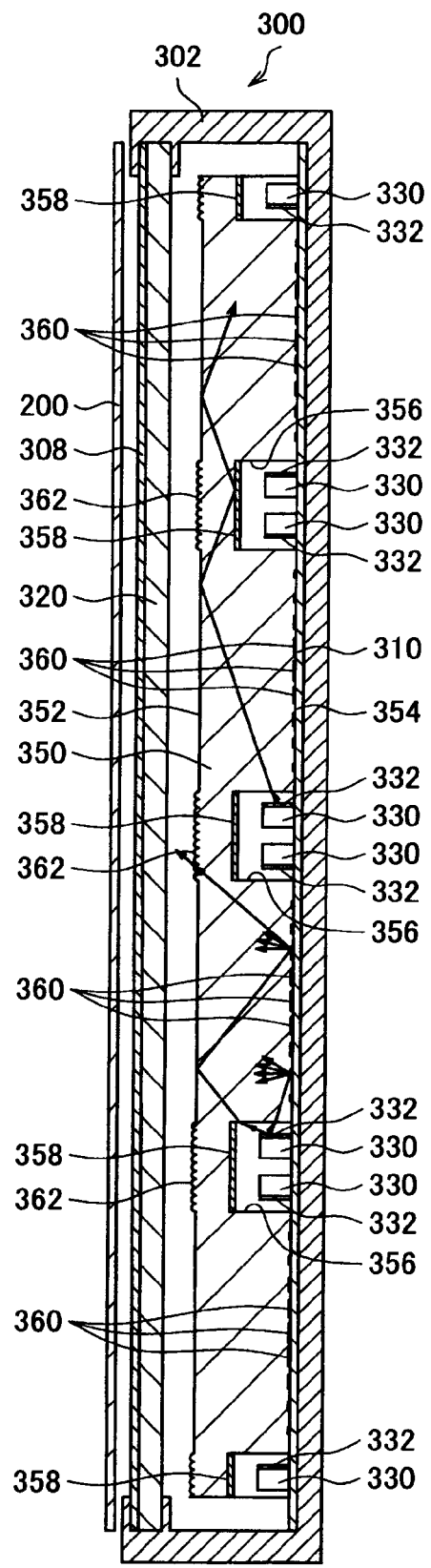
FIG. 2 is a side section view that shows a configuration of an image display device.

FIG. 2 is a side section view that shows a configuration of the image display device 100. Note that FIG. 2 shows the cross-sectional structure of the interior of the housing 102, and the housing 102 itself is omitted. As shown in FIG. 2, the area light source device 300 is provided in a housing 302, and the necessary portions of the area light source device 300 is disposed in the housing 302. The housing 302 is made of a metallic material or the like that has high thermal conductivity and it is formed into a flat box shape whose shortest dimension runs front to back and that is open at the front of the display device 100. An optical sheet 308 and a diffuser panel 320 are mounted on the front edge portion of the housing 302.

The optical sheet 308 is constructed by arranging in layers various types of sheets that have specified optical functions, such as a diffuser sheet that diffuses light, a prism sheet that refracts light and guides it in a specified direction, a polarization direction conversion sheet that converts the polarization direction of light, and the like.

The optical sheet 308 is mounted on the front face of the diffuser panel 320. The diffuser panel 320 functions to reduce any variation in the brightness of the display panel 200 by taking light that is emitted from light-emitting diodes 330 through a light guide plate 350, diffusing the light in the interior of the housing 302, and illuminating the display panel 200 from the rear.

A circuit board (not shown in FIG. 2) is disposed on the bottom face of the housing 302. A plurality of the light-emitting diodes 330 are disposed on the circuit board.

The light-emitting diodes 330 may be diodes that emit white light, for example, but they are not limited to being diodes that emit white light and may also be diodes that emit red light, blue light, and green light. For example, a plurality of light-emitting units, each of which is configured from a light-emitting diode 330 that emits red light, a light-emitting diode 330 that emits blue light, and two light-emitting diodes 330 that emit green light, may be disposed in a matrix arrangement. The number of the light-emitting diodes 330 and the colors of the light they emit can be determined as desired.

The light guide plate 350 is made from a transparent resin material such as acrylic or the like and is located on the display panel 200 side of the light-emitting diodes 330. Recessed portions 356 into which the light-emitting diodes 330 are inserted are provided in the light guide plate 350. A more detailed explanation will be provided later, but in the present embodiment, each of the recessed portions 356 accommodates a plurality of the light-emitting diodes 330, and each of the light-emitting diodes 330 emits light in a direction that is parallel to the surface of the light guide plate 350 (the direction in which the light guide plate 350 extends).

In some cases, if the light from the light-emitting diodes 330 strikes the diffuser panel 320 directly, the point light source areas of the light-emitting diodes 330 are visible on the display screen, but the appearance of the point light source areas on the display screen can be reliably suppressed by causing the light to reach the diffuser panel 320 through the light guide plate 350. Because the appearance of the point light source areas on the display screen can be suppressed by causing the light from the light-emitting diodes 330 to reach the diffuser panel 320 through the light guide plate 350, the light-emitting diodes 330 and the diffuser panel 320 can be moved closer to one another, such that the display device 100 can be made more compact.

The light that is emitted from light-emitting surfaces 332 of the light-emitting diodes 330 toward the inner wall surfaces of the recessed portions 356 enters the light guide plate 350 and is guided by the light guide plate 350. A reflective surface 358 is formed on the bottom surface of each of the recessed portions 356 such that the bottom surface of the recessed portion 356 prevents the light from striking the diffuser panel 320 directly.

The surface of the light guide plate 350 on the side that faces the diffuser panel 320 is a transmissive surface 352 that transmits light. The surface on the opposite side from the transmissive surface 352 is a non-transmissive surface 354. A diffusive reflective sheet 310 is provided on the non-transmissive surface 354 of the light guide plate 350. The diffusive reflective sheet 310 takes the light within the light guide plate 350 that is directed toward the non-transmissive surface 354 and diffuses and reflects it toward the transmissive surface 352, thus functioning to utilize the light more effectively. Note that a reflective sheet that has a mirror surface or the like that reflects light, but does not diffuse light, may also be used instead of the diffusive reflective sheet 310. A scattering reflective pattern 360 is also provided on the non-transmissive surface 354 of the light guide plate 350 in order to cause the light from the light-emitting diodes 330 that is guided within the light guide plate 350 to be emitted from the transmissive surface 352. The scattering reflective pattern 360 can be formed by providing a concavo-convex surface in a specified pattern on the non-transmissive surface 354 and can also be formed by carrying out silk-screen printing or the like on the non-transmissive surface 354.

Of the light that is reflected and diffused in the direction of the transmissive surface 352 by the scattering reflective pattern 360 and the diffusive reflective sheet 310, the light that strikes the transmissive surface 352 at an angle that is less than a critical angle is transmitted outside the light guide plate 350 from the transmissive surface 352. The transmitted light strikes the diffuser panel 320, and any irregularities in the light beams that occur immediately after the light is transmitted from the transmissive surface 352 are corrected more uniformly.

When the light reaches the diffuser panel 320, the optical sheet 308 further reduces any irregularities, increases the brightness, enhances the view angle characteristics, and the like, after which the light passes on to the display panel 200. The entire surface of the display panel 200 is thus uniformly lit.

In the locations where the recessed portions 356 are positioned, the thickness of the light guide plate 350 is reduced, and the portions through which the light is guided are thinner, so it is assumed that less light is transmitted from the transmissive surface 352 in the locations where the recessed portions 356 are positioned and that the brightness is slightly less than in the surrounding areas. Therefore, light discharge patterns 362 that are shaped like lenses or the like are formed in areas of the transmissive surface 352 that correspond to the recessed portions 356. Irregularities in contrast in the locations where the recessed portions 356 (and the reflective surfaces 358) are provided can thus be reliably suppressed.

High reflectivity treatment (mirror surface treatment, reflective diffusive treatment, or the like) is carried out for the surfaces of all materials that may possibly reflect light, such as the surfaces of the diffuser panel 320, the optical sheet 308, the housing 302, and the like. The light that is not discharged from the light guide plate 350 can thus be recycled by being reflected to the light guide plate 350, making it possible to improve the light discharge efficiency.

Figure 3:
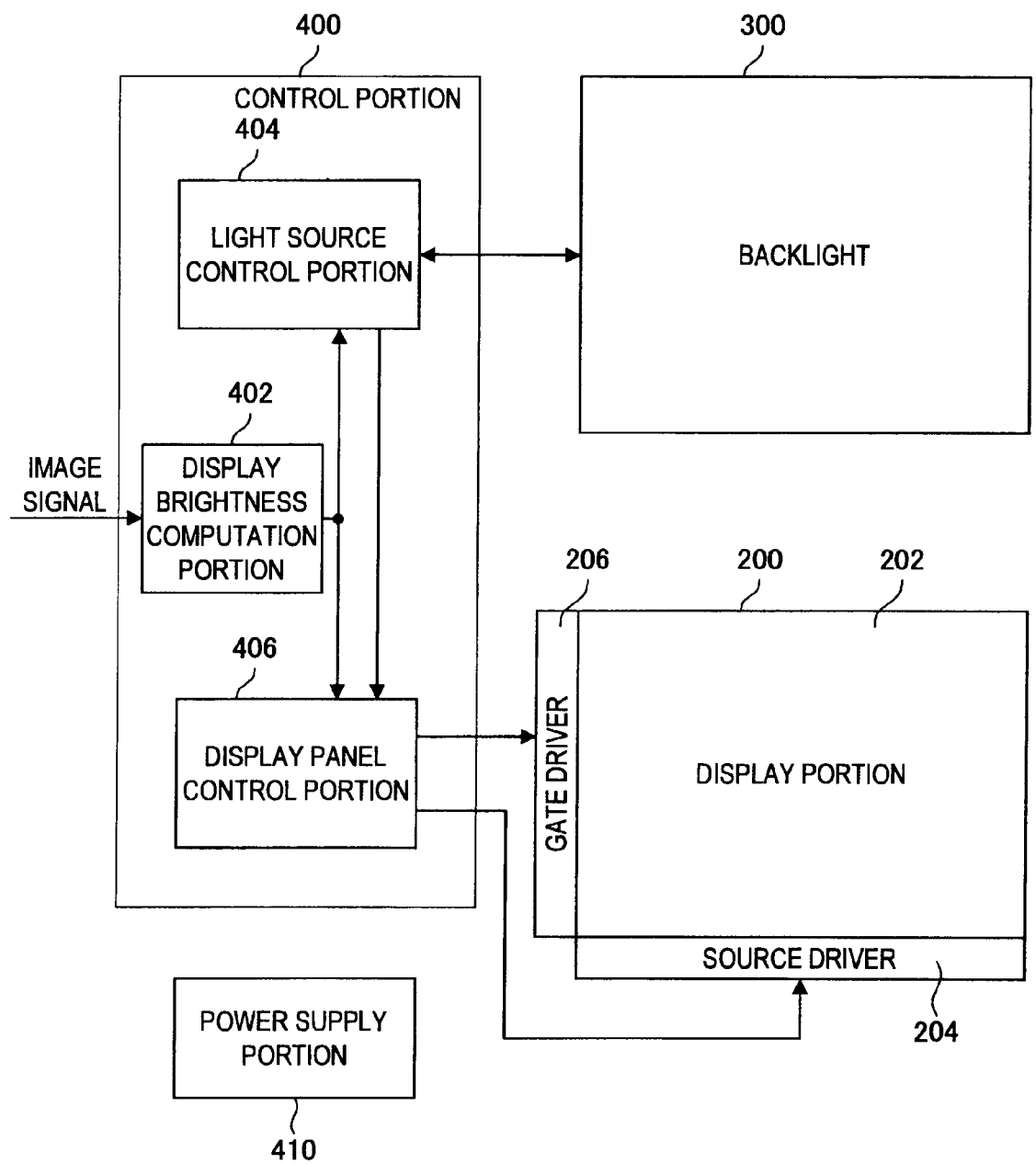
FIG. 3 is a functional block diagram that shows a configuration of a display device.

FIG. 3 is a functional block diagram that shows a configuration of the display device 100. The display device 100 is configured from the display panel 200, the area light source device 300, a control portion 400, and a power supply portion 410. The display panel 200 has a color filter panel, a liquid crystal layer, and the like. The area light source device 300 is disposed on the rear side of the display panel 200. The control portion 400 controls the display panel 200 and the area light source device 300. Note that the control portion 400 and the power supply portion 410 may be configured as integral parts of the display device 100 and may also be configured separately from the display device 100.

The display device 100 displays, in a specified display area (an area that corresponds to a display portion 202 of the display panel 200), a raw image that corresponds to an image signal. Note that an input image signal that is input to the display device 100 may be, for example, a signal that corresponds to an image (a frame image) with a 60 Hz frame rate.

The display panel 200 is provided with the display portion 202, in which a plurality of openings are arrayed that allow white light from the area light source device 300 to pass through. The display panel 200 is also provided with a source driver 204 and a gate driver 206 that transmit drive signals to a thin film transistor (TFT (not shown in the drawings)) that is provided in each of the openings in the display portion 202.

The white light that passes through the openings in the display portion 202 is converted into one of red light, green light, and blue light by a color filter that is formed on the color filter panel (not shown in the drawings). One group of three openings that respectively emit red light, green light, and blue light corresponds to one pixel in the display portion 202.

The area light source device 300 emits white light in a light emission area that corresponds to the display portion 202. As described later, the light emission area of the area light source device 300 is divided into a plurality of blocks (regions), and the light emission from each of the blocks is controlled individually.

The control portion 400 is configured from a display brightness computation portion 402, a light source control portion 404, and a display panel control portion 406. An image signal that corresponds to the frame image is input to the display brightness computation portion 402. Based on the supplied image signal, the display brightness computation portion 402 determines the brightness distribution in the frame image, then computes the required display brightness for each block based on the brightness distribution in the frame image. The computed display brightness is then supplied to the light source control portion 404 and the display panel control portion 406.

Based on the display brightness for each block that is supplied from the display brightness computation portion 402, the light source control portion 404 computes the backlight brightness for each block of the area light source device 300. The light source control portion 404 then uses pulse width modulation (PWM) control to control the amounts of light that are emitted by the light-emitting diodes 330 in each block to achieve the computed backlight brightness. Because the brightness of the light that is emitted from each block of the area light source device 300 can thus be controlled in accordance with the input image signal, it is possible to achieve the optimum light emission for the image that is displayed on the display panel 200. Note that in the explanation that follows, the controlling of the brightness of the light that is emitted from each block of the area light source device 300 is called divided light emission drive.

Based on one of the brightness and the color of the light that is emitted from each block, as detected by a sensor that is disposed in the area light source device 300, the light source control portion 404 performs light emission control in order to correct one of the brightness and the color of the emitted light. The sensor is one of an illumination sensor, a color sensor, and the like.

The backlight brightness of each block of the area light source device 300 that is computed by the light source control portion 404 is supplied to the display panel control portion 406. Based on the display brightness for each block that is supplied by the display brightness computation portion 402 and on the backlight brightness for each block that is supplied by the light source control portion 404, the display panel control portion 406 computes the liquid crystal aperture ratio for each pixel in the display portion 202. In order to achieve the computed liquid crystal aperture ratio, the display panel control portion 406 performs drive control of the TFT in each pixel of the display portion 202 by supplying drive signals to the source driver 204 and the gate driver 206 of the display panel 200. The power supply portion 410 supplies a specified amount of power to each portion of the display device 100.

2. Configuration of the Light Guide Plate

Figure 4:
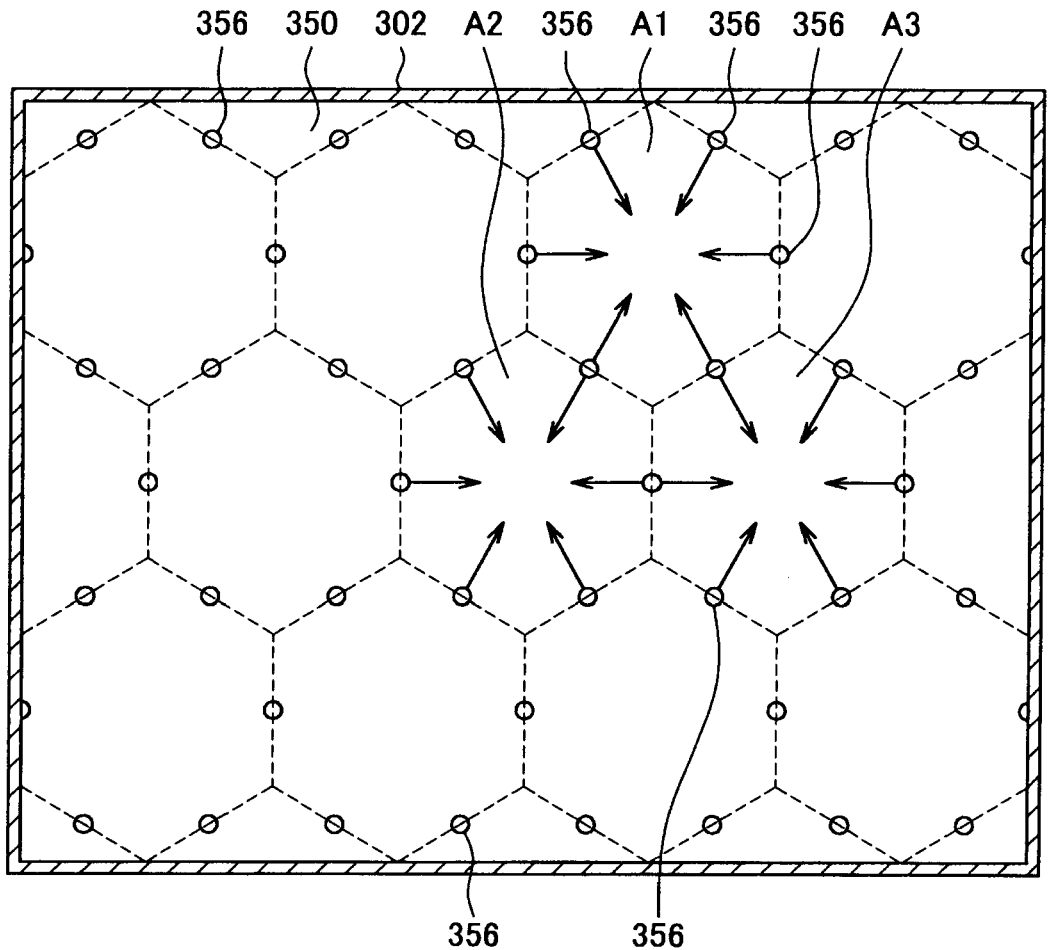
FIG. 4 is a plan view that shows a configuration of an area light source device.

FIG. 4 is a plan view that shows a configuration of the area light source device 300. The plurality of the recessed portions 356 are provided in the light guide plate 350 that is disposed inside the housing 302 of the area light source device 300. The light guide plate 350 is partitioned into a plurality of light-emitting areas (light-emitting regions) by hypothetical lines that are indicated by broken lines. In the present embodiment, the display device 100 performs the divided light emission drive by treating each light-emitting area as a single block and controlling the brightness of the light that is emitted by the area light source device 300 for each individual block. In the example that is shown in FIG. 4, the light-emitting areas are in the form of regular hexagons and are configured in a honeycomb pattern. In a case where the light guide plate 350 is partitioned into a plurality of regular hexagons by the light-emitting areas, as shown in FIG. 4, the recessed portions 356 are positioned at the midpoints of the sides of the hexagons.

Note that the number of the light-emitting areas into which the light guide plate 350 can be divided is not limited and may be chosen as desired in order to make it possible for light to be emitted uniformly from the light guide plate 350, depending on the size in inches of the display device 100, the number of the light-emitting diodes 330 and the amounts of light they emit, the desired brightness, and the like.

As shown in FIG. 2, the recessed portions 356 are formed on the non-transmissive surface 354 side of the light guide plate 350, and the light-emitting diodes 330 that are mounted on the circuit board are accommodated in the recessed portions 356.

Figure 5:
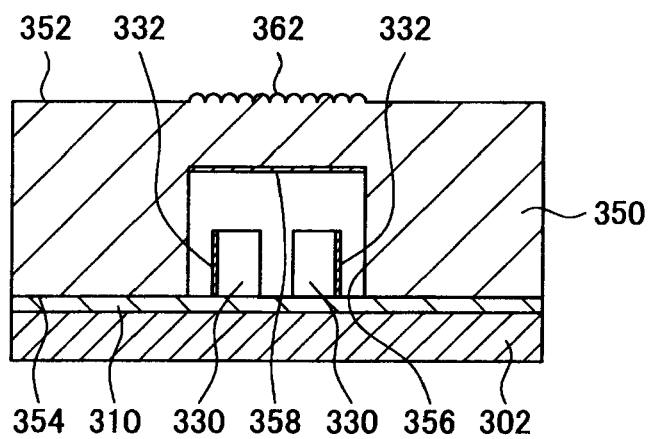
FIG. 5 is a schematic drawing that shows an enlarged view of an area around a recessed portion in FIG. 2.

FIG. 5 is a schematic drawing that shows an enlarged view of an area around one of the recessed portions 356 in FIG. 2. As shown in FIG. 5, two of the light-emitting diodes 330 are disposed in each of the recessed portions 356 that are provided in the light guide plate 350. The light-emitting diodes 330 may be side view type diodes, for example, and they are mounted on the circuit board. The light-emitting diodes 330 emit light in the direction that is parallel to the surface of the light guide plate 350.

A top view type of diode may also be used for the light-emitting diodes 330, and they may be mounted on the circuit board such that their light-emitting surfaces 332 face in the direction that is parallel to the surface of the light guide plate 350. Ordinarily, when the top view type of the light-emitting diode 330 is mounted on the circuit board, the light-emitting surface 332 faces upward from the circuit board (in a direction that is orthogonal to the surface of the board), and the light is emitted in the direction that is orthogonal to the surface of the circuit board. Therefore, in a case where the top view type of the light-emitting diode 330 is used, the light-emitting diode 330 is connected through a flexible printed circuit board or the like, such that the light-emitting diode 330 is disposed facing to the side, and the light is emitted in a direction that is parallel to the transmissive surface 352 of the light guide plate 350. Note that in the present embodiment, an example is shown in which the recessed portions 356 are shaped such that their planar footprints are circular, as shown in FIG. 4, but the planar footprints of the recessed portions 356 are not limited to being circular. A variety of shapes can be freely chosen for the planar footprints of the recessed portions 356, such as a triangle, a square, a hexagon, and the like.

As shown in FIG. 5, the bottom face of the recessed portion 356 is flat, and the reflective surface 358, the surface of which has been treated to be reflective, is formed on the bottom face. The reflective surface 358 can be formed by depositing a reflective film of aluminum, silver, or the like, for example, on the bottom face. The reflective surface 358 can also be formed by applying to the bottom face a material with high reflectivity, such as a film or the like that is coated with aluminum, silver, or the like, for example. Because the reflective surface 358 is provided, the light that is emitted from the light-emitting diode 330 toward the bottom face of the recessed portion 356 is reflected by the reflective surface 358. Thus the light that does not enter the light guide plate 350 directly can be reflected and guided to the light guide plate 350, making it possible to increase the efficiency with which the light enters the light guide plate 350. Furthermore, it is assumed that a steep brightness peak will appear in the transmissive surface 352 in a position that corresponds to the recessed portion 356, due to the light that travels directly upward from the light-emitting diode 330 to the transmissive surface 352, but providing the reflective surface 358 to reflect the upward traveling light makes it possible to suppress the steep brightness peak. Thus the diffuser panel 320 and the light guide plate 350 can be moved closer to one another, such that the display device 100 can be made more compact.

Figure 6:
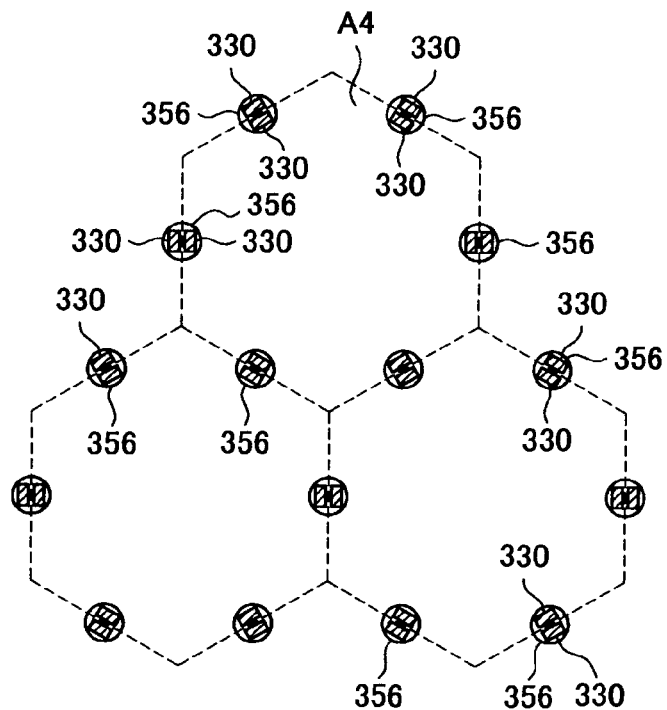
FIG. 6 is a plan view that shows positional relationships between hexagonal light-emitting areas and light-emitting diodes in recessed portions.

3. Positional Relationships Between the Hexagonal Light-emitting Areas and the Light-emitting Diodes in the Recessed Portions FIG. 6 is a plan view that shows positional relationships between the hexagonal light-emitting areas and the light-emitting diodes 330 in the recessed portions 356. The two light-emitting diodes 330 that are disposed in each of the recessed portions 356 are arranged such that their light-emitting surfaces 332 face in opposite directions, and each of the light-emitting surfaces 332 is disposed such that it is parallel to the side of the hexagon. Thus the light is emitted from each of the light-emitting diodes 330 in a direction that is close to the center of the hexagonal light-emitting area.

The light-emitting diodes 330 that are disposed in each of the recessed portions 356 thus emit light toward the centers of adjacent hexagonal light-emitting areas. Further, because a recessed portion 356 is disposed at the midpoint of each side of each of the hexagonal light-emitting areas, each hexagonal light-emitting area is illuminated by the six light-emitting diodes 330 that are disposed on each of its sides. It thus becomes possible to illuminate the entire hexagonal light-emitting area uniformly, without any irregularities. Furthermore, because the light-emitting diodes 330 that are disposed on each side of each of the light-emitting areas emit light toward the centers of the light-emitting areas, the emission of the light can be performed symmetrically with respect to the center of each of the light-emitting areas, and uniform light emission can be achieved in each of the areas.

In a case where the divided light emission drive is performed, as described above, each hexagonal light-emitting area serves as one block, and the amount of light that is emitted is controlled for each block. FIG. 4 shows a state in which, of the light-emitting diodes 330 that are disposed in the plurality of the recessed portions 356, only the light-emitting diodes 330 whose light-emitting surfaces 332 face the centers of regions A1, A2, and A3, which are light-emitting areas, are made to emit light by the divided light emission drive. For example, in a case where light is emitted in only one hexagonal region that is indicated as region A4 in FIG. 6, only the six light-emitting diodes 330 that face toward the center of the region A4 are made to emit light, and the other light-emitting diodes 330 are not made to emit light. It is thus possible to cause light to be emitted only in the region A4, and area light emission that is suitable for the divided light emission drive can be performed.

In this case, because the light-emitting diodes 330 that illuminate the region A4 all emit light in the direction of the center of the region A4, any leakage of light outside the region A4 can be kept to a minimum. Therefore in a case where the divided light emission drive causes light to be emitted only in a specified hexagonal light-emitting area, the leakage of light to other light-emitting areas can be kept to a minimum, and the light can be allowed to be emitted only in the desired light-emitting area.

Particularly in a case where the divided light emission drive is performed, causing the light to be emitted only in a specific light-emitting area makes it possible to achieve the optimum light emission in each block, in accordance with the displayed image, thus enhancing both the controllability and the convenience of the divided light emission drive. In the present embodiment, the light-emitting surface 332 of each of the light-emitting diodes 330 is disposed such that it faces toward the center of the hexagonal light-emitting area, so in a case where the light is allowed to be emitted only in a specific light-emitting area, the leakage of light into other light-emitting areas can be inhibited. Therefore, the convenience of the divided light emission drive can be enhanced, and the divided light emission drive can be performed optimally by the area light source device 300 over the entire surface of the display panel 200 in accordance with the image that is displayed on the display panel 200.

Furthermore, because the light-emitting diodes 330 that are disposed on each side of each of the hexagonal regions are all disposed such that their light-emitting surfaces 332 face the centers of the hexagonal regions, it is possible within each of the hexagonal regions to achieve light emission that is uniform and has no irregularities in contrast. Therefore, even in a case where light is caused to be emitted in all of the regions of the light guide plate 350, the light can be emitted densely in each of the light-emitting areas, making it possible to perform light emission that is uniform over the entire light guide plate 350 and has no irregularities in contrast.

Moreover, in a case where light is caused to be emitted in all of the light-emitting areas, the light emission is performed uniformly over the entire light guide plate 350, so the patterns that are created on the non-transmissive surface 354 and the transmissive surface 352 are optimized. As described previously, it is assumed that the brightness diminishes in the regions of the transmissive surface 352 that correspond to the recessed portions 356, so it is desirable for the surface area of the bottom face of each of the recessed portions 356 to be kept to a minimum. It is also assumed that comparatively little light is guided to the areas in the vicinity of the vertices of the hexagons in FIGS. 4 and 6 and that the brightness is slightly lower in those areas. Even in this case, the drop in the brightness in the vicinity of the vertices of the hexagons can be kept to a minimum, and uniform transmission of the light can be achieved, by optimizing the patterns of the diffusive reflective sheet 310, the scattering reflective pattern 360, the light discharge pattern 362, and the like that are created on the non-transmissive surface 354 and the transmissive surface 352.

Figure 7:
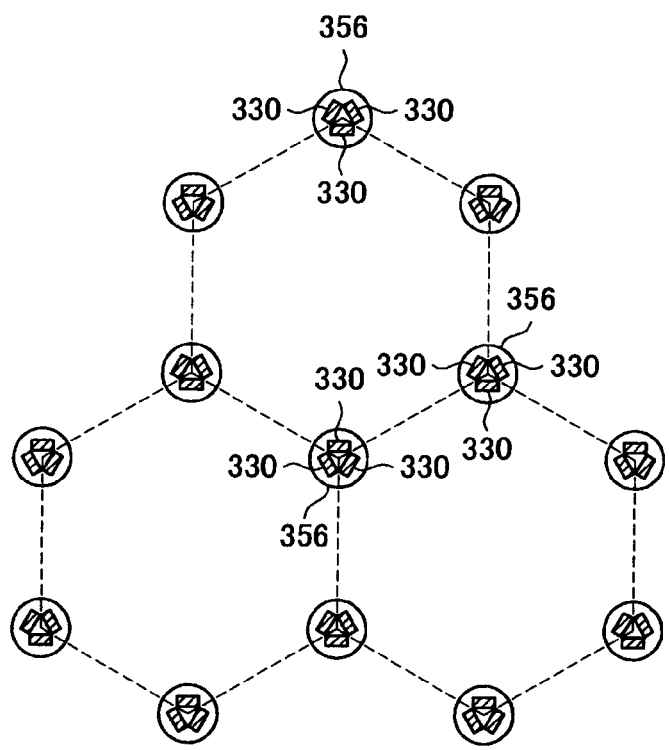
FIG. 7 is a schematic drawing that shows an example in which recessed portions are disposed at vertices of hexagons and three light-emitting diodes are disposed in each recessed portion.

4. Other Examples of Arrangements of the Light-emitting Areas and the Light-emitting Diodes FIGS. 7 to 10 are schematic drawings that show other examples of arrangements of the light-emitting diodes 330 on the light guide plate 350. FIG. 7 shows an example in which the recessed portions 356 are disposed at the vertices of the hexagonal light-emitting areas and three light-emitting diodes 330 are disposed in each of the recessed portions 356. Even in the example in FIG. 7, the light-emitting surface 332 of each of the light-emitting diodes 330 that are disposed in the recessed portions 356 is disposed such that it faces toward the center of the hexagonal light-emitting area. At each of the vertices of the hexagons, three hexagons abut one another, so the light-emitting surfaces 332 of the three light-emitting diodes 330 that are disposed in each of the recessed portions 356 respectively face the centers of the three adjacent light-emitting areas.

Each of the hexagonal light-emitting areas is illuminated by the six light-emitting diodes 330 that are disposed at the vertices of the hexagon. Therefore, even in the example in FIG. 7, it is possible to cause the light to be emitted uniformly in each of the light-emitting areas. Further, in a case where light is emitted in all of the regions of the light guide plate 350, it is possible to perform the light emission with uniform contrast and no irregularities over the entire light guide plate 350.

Figure 8:
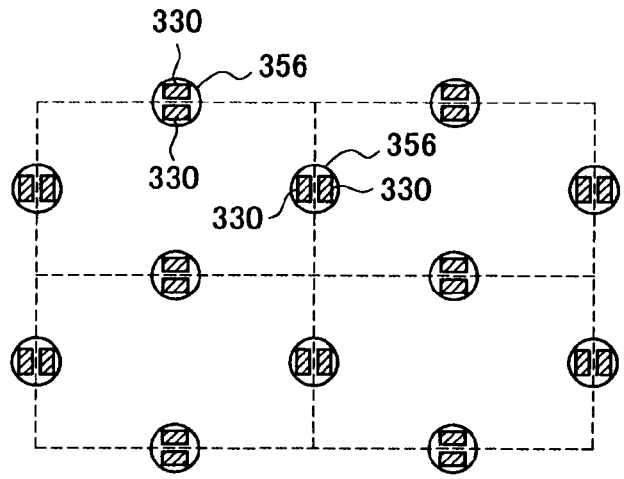
FIG. 8 is a schematic drawing that shows an example in which a light-emitting area is a quadrilateral (a rectangle) and recessed portions are provided at the midpoints of the sides of the quadrilateral.

FIG. 8 shows an example in which a light-emitting area is a quadrilateral (a rectangle, a square, or the like) and the recessed portions 356 are provided at the midpoints of the sides of the quadrilateral. Two of the light-emitting diodes 330 are disposed in each of the recessed portions 356, and the light-emitting surfaces 332 of the light-emitting diodes 330 are disposed such that they respectively face toward the centers of two adjacent quadrilateral light-emitting areas.

In the example in FIG. 8, each of the quadrilateral light-emitting areas is illuminated by four light-emitting diodes 330 that are disposed at the midpoints of the sides of the quadrilateral. Therefore, even in the example in FIG. 8, it is possible to cause light to be emitted uniformly in each of the quadrilateral light-emitting areas. Further, in a case where light is emitted in all of the regions of the light guide plate 350, it is possible to perform the light emission with uniform contrast and no irregularities over the entire light guide plate 350.

Figure 9:
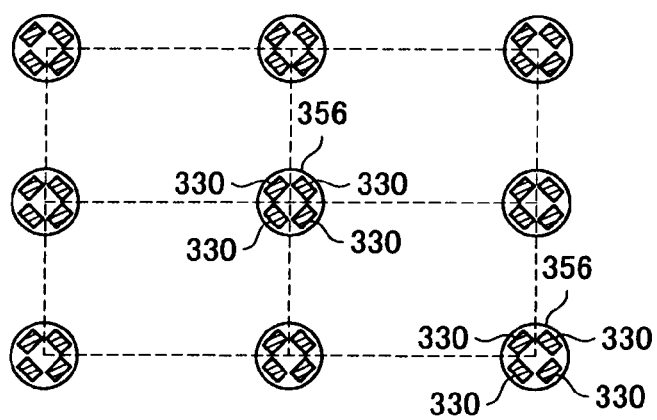
FIG. 9 is a schematic drawing that shows an example in which a light-emitting area is a quadrilateral (a rectangle), recessed portions are disposed at the vertices of the quadrilateral, and four light-emitting diodes are disposed in each recessed portion.

FIG. 9 shows an example in which the light-emitting areas are quadrilaterals (rectangles), the recessed portions 356 are disposed at the vertices of the quadrilaterals, and four of the light-emitting diodes 330 are disposed in each of the recessed portions 356. Even in the example in FIG. 9, the light-emitting surfaces 332 of the light-emitting diodes 330 that are disposed in each of the recessed portions 356 are disposed such that they respectively face toward the centers of four quadrilateral regions that abut one another at their vertices. In this configuration, each of the quadrilateral light-emitting areas is illuminated by the four light-emitting diodes 330 that are disposed at its vertices. Therefore, even in the example in FIG. 9, it is possible to cause light to be emitted uniformly in each of the quadrilateral light-emitting areas, and in a case where light is emitted in all of the regions of the light guide plate 350, it is possible to perform the light emission with uniform contrast and no irregularities over the entire light guide plate 350.

Figure 10:
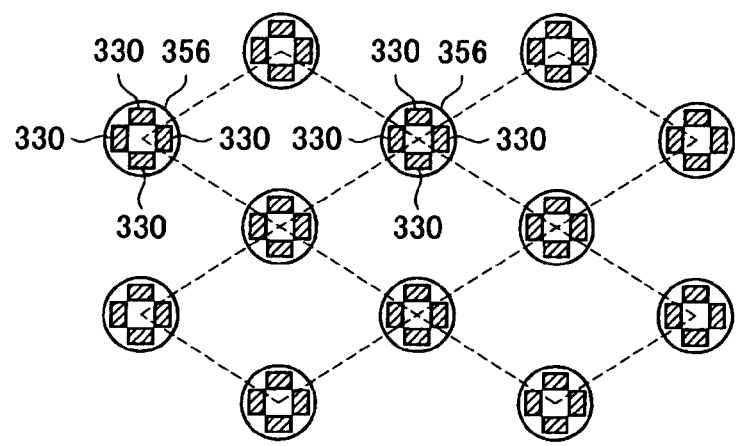
FIG. 10 is a schematic drawing that shows an example in which a light-emitting area is a quadrilateral (a rhombus), recessed portions are disposed at the vertices of the rhombus, and four light-emitting diodes are disposed in each recessed portion.

FIG. 10 shows an example in which the light-emitting areas are quadrilaterals (rhombuses), the recessed portions 356 are disposed at the vertices of the rhombuses, and four of the light-emitting diodes are disposed in each of the recessed portions 356.

Even in the example in FIG. 10, the light-emitting surfaces 332 of the light-emitting diodes 330 that are disposed in each of the recessed portions 356 are disposed such that they respectively face toward the centers of four rhomboid regions that abut one another at the vertices of the rhombuses. Therefore, even in the example in FIG. 10, it is possible to cause light to be emitted uniformly in each of the quadrilateral light-emitting areas, and in a case where light is emitted in all of the regions of the light guide plate 350, it is possible to perform the light emission with uniform contrast and no irregularities over the entire light guide plate 350. In the example in FIG. 10, the recessed portions 356 may also be provided at the midpoints of the sides, in the same manner as in FIG. 8, and two of the light-emitting diodes 330 may be disposed in each of the recessed portions 356.

Figure 11:
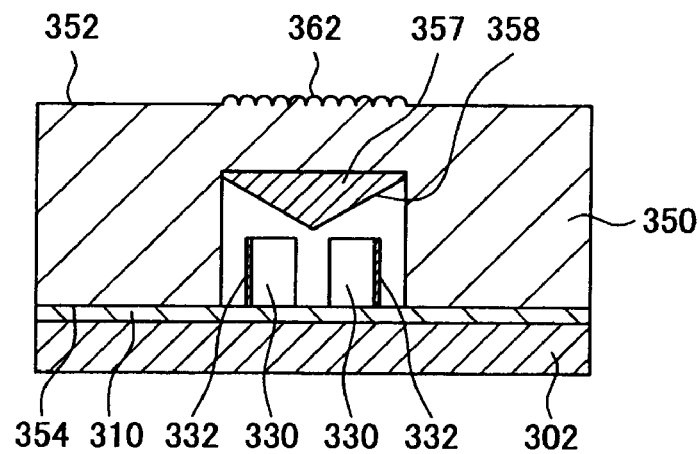
FIG. 11 is a schematic drawing that shows an example in which the bottom surface of a recessed portion is formed into a protruding conical shape.

FIG. 11 shows an example in which the bottom surface of the recessed portion 356 is formed into a protruding conical shape 357. The reflective surface 358 is provided on the surface of the protruding conical shape 357. In this configuration, the light that is emitted from the light-emitting diodes 330 toward the bottom surface of the recessed portion 356 is reflected by the protruding conical shape 357 and travels in the direction that is parallel to the surface of the light guide plate 350. Therefore, the light that is emitted from the light-emitting diodes 330 can be utilized more effectively than in a case where the bottom surface of the recessed portion 356 is flat, and the light that is emitted from the light-emitting diodes 330 can enter the light guide plate 350 more efficiently.

Figure 12:
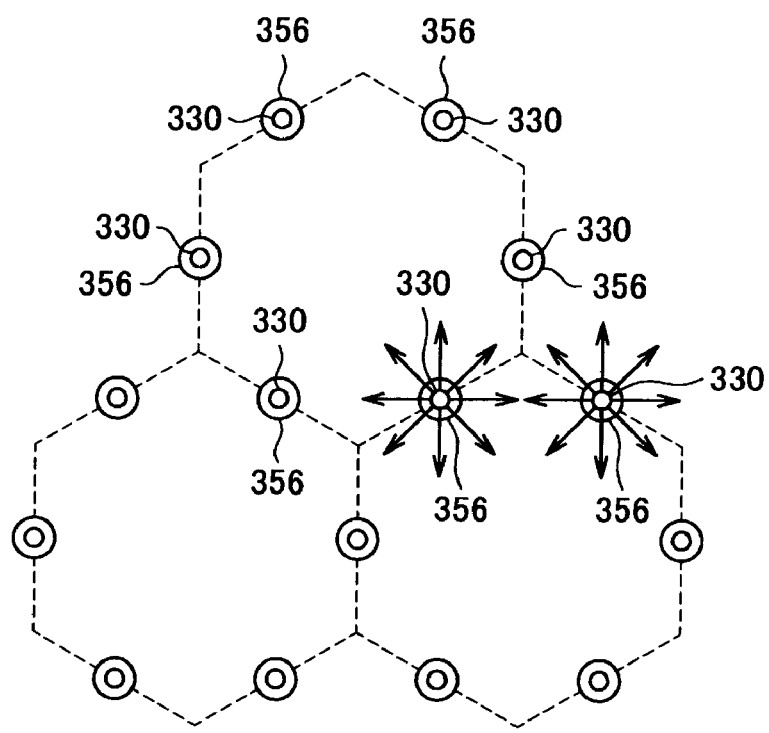
FIG. 12 is a schematic drawing that shows a case in which a side emitter type of light-emitting diode is used.

Note that, as described previously, side view type diodes and top view type diodes can be used as the light-emitting diodes 330, but side emitter type light-emitting diodes 330 can also be used. In the case of the side emitter type light-emitting diode 330, as shown in FIG. 12, one light-emitting diode 330 can emit light over a range of 360 degrees. Therefore, in a case where the side emitter type light-emitting diode 330 is used, one light-emitting diode 330 is installed in each of the recessed portions 356. Even in this case, the divided light emission drive can be performed by controlling whether the light-emitting diodes 330 in each of the light-emitting areas in the light guide plate 350 emit light or do not emit light.

According to the embodiment that has been explained above, the light guide plate 350 is partitioned into the plurality of the light-emitting areas, the recessed portions 356 are provided around the perimeter of each of the light-emitting areas, and light is emitted toward the center of each of the light-emitting areas from the light-emitting diodes 330 that are provided in each of the recessed portions 356. Thus each of the light-emitting areas can be symmetrically illuminated by the plurality of the light-emitting diodes 330 that are disposed around its perimeter, and it is possible to cause light to be emitted uniformly over the entire light-emitting area without any irregularities. It therefore becomes possible to cause light to be emitted in only a specific light-emitting area, it becomes possible to achieve the optimum light emission for each block that corresponds to the display image, and the controllability and convenience of the divided light emission drive can be enhanced.

The present invention contains subject matter related to Japanese Patent Application JP 2008-247776 filed in the Japan Patent Office on Sep. 26, 2008, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An area light source device, comprising:
a plate-shaped light guide plate that has one surface that serves as a transmissive surface and another surface that is on the opposite side from the transmissive surface, the light guide plate being partitioned into a plurality of light-emitting areas, wherein the light-emitting areas
are defined by lines joining a plurality of recessed portions, and;
and are laid out by arranging the plurality of the light-emitting areas such that they abut one another
such that the plurality of recessed portions are in the surface on the opposite side of the transmissive surface, and provided along the perimeters of the light-emitting areas, wherein the recessed portions are disposed at the vertices or midpoints of the sides of the light-emitting areas;
and at least three light-emitting elements that are accommodated in each of the recessed portions, each light-emitting element having one planar light-emitting face
whose plane extends in a direction that is normal to the direction in which the light guide plate extends and faces toward the central region of a light-emitting area;
that emits light in a direction in which the light guide plate extends and in a direction orthogonal to the planar light-emitting face of the light-emitting element; and
wherein planes of the three planar light emitting faces in the recessed portion are angularly oriented such that each of the three planes are facing non-opposing different directions.

2. The area light source device according to claim 1, wherein the light-emitting areas are hexagonal, and the light-emitting areas of the light guide plate are laid out by arranging the plurality of the light-emitting areas in a honeycomb structure.

3. The area light source device according to claim 2, wherein the recessed portions are disposed at the midpoints of the sides of the hexagonal light-emitting areas, two of the light-emitting elements are accommodated in each of the recessed portions, and the light-emitting faces of the two light-emitting elements are disposed such that they respectively face toward the central regions of the two hexagonal light-emitting areas that abut one another at the side where the recessed portion is disposed.

4. The area light source device according to claim 2, wherein the recessed portions are disposed at the vertices of the hexagonal light-emitting areas, three of the light-emitting elements are accommodated in each of the recessed portions, and the light-emitting faces of the three light-emitting elements are disposed such that they respectively face toward the central regions of the three hexagonal light-emitting areas that abut one another at the vertex where the recessed portion is disposed.

5. The area light source device according to claim 1, wherein the recessed portions are disposed at the midpoints of the sides of the quadrilateral light-emitting areas, two of the light-emitting elements are accommodated in each of the recessed portions, and the light-emitting faces of the two light-emitting elements are disposed such that they respectively face toward the central regions of the two quadrilateral light-emitting areas that abut one another at the side where the recessed portion is disposed.

6. The area light source device according to claim 1, wherein the recessed portions are one of rectangles, squares, and rhombuses.

7. The area light source device according to claim 1, wherein transmissive shapes that are one of a prism and a lens are provided at positions in the transmissive surface that correspond to the recessed portions.

8. The area light source device according to claim 1, wherein one of a scattering pattern and a reflective sheet are provided on the surface that is on the opposite side from the transmissive surface.

9. The area light source device according to claim 1, wherein the light-emitting elements are configured from light-emitting diodes that are one of a side view type and a top view type.

10. The area light source device according to claim 1, wherein the amount of light that is emitted by the light-emitting area is different than the amount of light that is emitted by one of the plurality of light-emitting areas.

11. An area light source device, comprising:
a plate-shaped light guide plate that has one surface that serves as a transmissive surface and another surface that is on the opposite side from the transmissive surface, the light guide plate being partitioned into a plurality of light-emitting areas, wherein the light-emitting areas
are defined by lines joining a plurality of recessed portions, and ;
and are laid out by arranging the plurality of the light-emitting areas such that they abut one another
such that the a plurality of recessed portions are in the surface on the opposite side of the transmissive surface, and provided along the perimeters of the light-emitting areas, reflective surfaces being provided on the surfaces, opposite from the surface in which a plurality of recessed portions are provided, of the recessed portions, wherein the recessed portions are disposed at the vertices or midpoints of the sides of the light-emitting areas; and
at least three light-emitting elements that are accommodated in each of the recessed portions, each light-emitting element having one planer light-emitting face
whose plane extends in a direction that is normal to the direction in which the light guide plate extends and faces towards the central region of a light emitting area;

that emits light in a direction in which the light guide plate extends and in a direction orthogonal to the planar light-emitting face of the light-emitting element; and wherein planes of the three planar light emitting faces in the recessed portion are angularly oriented such that each of the three planes are facing non-opposing different directions.

12. A display device, comprising:

a display panel that displays an image; and an area light source that includes a plate-shaped light guide plate, one surface of which serves as a transmissive surface, that is provided with a plurality of recessed portions in a surface that is on the opposite side from the transmissive surface, the light guide plate being partitioned into a plurality of light-emitting areas, wherein the plurality light-emitting areas are defined by lines joining a plurality of recessed portions, the plurality of recessed portions are arranged along the perimeters of the light-emitting areas and are disposed at the vertices or midpoints of the sides of the light-emitting areas, and the plurality of light-emitting areas are laid out such that they abut one another, and also includes at least three light-emitting elements that are accommodated in each of the recessed portions, each light-emitting element having one planar light-emitting face whose plane extends in a direction that is normal to the direction in which the light guide plate extends and faces toward the central region of a light-emitting area;

that emits light in a direction in which the light guide plate extends and in a direction orthogonal to the planar light-emitting face of the light-emitting element; and wherein planes of the three planar light emitting faces in the recessed portion are angularly oriented such that each of the three planes are facing non-opposing different directions the area light source being disposed such that it faces the display panel.

13. The display device according to claim 12, wherein the light-emitting areas are hexagonal, and the light-emitting areas of the light guide plate are laid out by arranging the plurality of the light-emitting areas in a honeycomb structure.

14. The display device according to claim 13, wherein the recessed portions are disposed at the midpoints of the sides of the hexagonal light-emitting areas, two of the light-emitting elements are accommodated in each of the recessed portions, and the light-emitting faces of the two light-emitting elements are disposed such that they respectively face toward the central regions of the two hexagonal light-emitting areas that abut one another at the side where the recessed portion is disposed.

15. The display device according to claim 13, wherein the recessed portions are disposed at the vertices of the hexagonal light-emitting areas, three of the light-emitting elements are accommodated in each of the recessed portions, and the light-emitting faces of the three light-emitting elements are disposed such that they respectively face toward the central regions of the three hexagonal light-emitting areas that abut one another at the vertex where the recessed portion is disposed.

16. The display device according to claim 12, wherein the amount of light that is emitted by the light-emitting area is different than the amount of light that is emitted by one of the plurality of light-emitting areas.

\* \* \* \* \*